US011891279B2

United States Patent

(12) United States Patent
Kawabuchi et al.

(10) Patent No.: US 11,891,279 B2
(45) Date of Patent: Feb. 6, 2024

(54) EXPANSION DEVICE AND CRANE

(71) Applicant: TADANO LTD., Kagawa (JP)

(72) Inventors: Naoto Kawabuchi, Kagawa (JP); Hiroshi Kitayama, Kagawa (JP); Naotaka Masuda, Lauf a.d. Pegnitz (DE); Hisanori Wada, Kagawa (JP); Takashi Kawano, Kagawa (JP)

(73) Assignee: TADANO LTD., Kagawa (JP)

(*) Notice: Subject to any disclaimer, the term of this patent is extended or adjusted under 35 U.S.C. 154(b) by 364 days.

(21) Appl. No.: 17/600,222

(22) PCT Filed: Mar. 14, 2019

(86) PCT No.: PCT/JP2019/010473
§ 371 (c)(1),
(2) Date: Sep. 30, 2021

(87) PCT Pub. No.: WO2020/183686
PCT Pub. Date: Sep. 17, 2020

(65) Prior Publication Data

US 2022/0227608 A1 Jul. 21, 2022

(51) Int. Cl.
*B66C 23/00* (2006.01)
*B66C 23/70* (2006.01)

(52) U.S. Cl.
CPC .................................. *B66C 23/705* (2013.01)

(58) Field of Classification Search
CPC ....... B66C 13/12; B66C 23/04; B66C 23/701; B66C 23/705; B66C 23/708; B66C 23/707
See application file for complete search history.

(56) References Cited

U.S. PATENT DOCUMENTS 3,212,604 A * 10/1965 Garnett ................. B66F 11/046 182/2.11
3,591,016 A * 7/1971 Hanada ................. B66C 23/705 212/231
(Continued)

FOREIGN PATENT DOCUMENTS

CA 2860737 A1 * 2/2015 ........... B66C 23/705
DE 60023506 T2 * 8/2006 ........... B66C 23/705
(Continued)

OTHER PUBLICATIONS

May 21, 2019, International Search Report issued for related PCT application No. PCT/JP2019/010473.
(Continued)

*Primary Examiner* — Emmanuel M Marcelo
(74) *Attorney, Agent, or Firm* — Paratus Law Group, PLLC

(57) ABSTRACT

This expansion device is an expansion device that expands and contracts an boom, the expansion device including: a first hydraulic source that discharges a first working fluid; an expandable cylinder that has a fixed part and a movable part and is operated by the first working fluid; a second hydraulic source that is provided to the movable part, discharges the second working fluid, and is a separate hydraulic source from the first hydraulic source; a first connecting mechanism that is operated by the second working fluid and switches between a connected state and a disconnected state of the first boom element and the movable part; and a second connecting mechanism that is operated by the second working fluid and switches between a connected state and a disconnected state of the first boom element and the second boom element.

14 Claims, 9 Drawing Sheets

(56) References Cited

U.S. PATENT DOCUMENTS

| | | | | | |
|---|---|---|---|---|---|
| 3,736,710 | A * | 6/1973 | Sterner | B66C 23/705 | 52/114 |
| 3,795,321 | A * | 3/1974 | Johnston | B66C 23/705 | 212/177 |

FOREIGN PATENT DOCUMENTS

| | | | | |
|---|---|---|---|---|
| JP | 2002-308568 A | 10/2002 | | |
| JP | 2002-332194 A | 11/2002 | | |
| JP | 2017-154875 A | 9/2017 | | |
| WO | WO-2018009980 A1 * | 1/2018 | | B25J 15/026 |
| WO | WO-2019230656 A1 * | 12/2019 | | B66C 23/42 |

OTHER PUBLICATIONS

May 21, 2019, International Search Opinion issued for related PCT application No. PCT/JP2019/010473.

Sep. 29, 2022, European Search Report issued for related EP Application No. 19918549.7.

* cited by examiner

| NO | Boom | % | | | | |
|---|---|---|---|---|---|---|
| | | 2 | 3 | 4 | 5 | 6 |
| 1 | 11.7m | 0 | 0 | 0 | 0 | 0 |
| 2 | 15.5m | 0 | 0 | 0 | 0 | 47 |
| 3 | 19.2m | 0 | 0 | 0 | 0 | 93 |
| 4 | 23.0m | 0 | 0 | 0 | 47 | 93 |
| 5 | 26.7m | 0 | 0 | 0 | 93 | 93 |
| 6 | 30.5m | 0 | 0 | 47 | 93 | 93 |
| 7 | 34.2m | 0 | 0 | 93 | 93 | 93 |
| 8 | 38.0m | 0 | 47 | 93 | 93 | 93 |
| 9 | 41.7m | 0 | 93 | 93 | 93 | 93 |
| 10 | 45.5m | 47 | 93 | 93 | 93 | 93 |
| 11 | 49.2m | 93 | 93 | 93 | 93 | 93 |

EXPANSION DEVICE AND CRANE

CROSS REFERENCE TO PRIOR APPLICATION

This application is a National Stage Patent Application of PCT International Patent Application No. PCT/JP2019/010473 (filed on Mar. 14, 2019) under 35 U.S.C. § 371, which is hereby incorporated by reference in its entirety.

TECHNICAL FIELD

The present invention relates to an expansion device that expands and contracts an expandable boom of a mobile crane, and a crane on which the expansion device is mounted.

BACKGROUND ART

As an expansion device of an expandable boom of a mobile crane, an expansion device in which a boom element constituting an expandable boom expands and contracts stage by stage by a single expandable cylinder (hydraulic cylinder) built in the expandable boom has been put into practical use (hereinafter, referred to as a "single-cylinder expansion device"). Since the single-cylinder expansion device has a single expandable cylinder, a weight of the entire expansion device can be reduced, and lifting performance of the mobile crane can be improved (see, for example, Patent Literature 1).

A characteristic configuration of the single-cylinder expansion device includes boom connecting means, connecting pin driving means, and cylinder-boom connecting means to be described below.

The boom connecting means is provided on an inner boom element of a pair of adjacent boom elements. The boom connecting means has a connecting pin (hereinafter, referred to as a "B pin") for connecting (fixing) the inner boom element and an outer boom element. The boom connecting means connects the inner boom element and the outer boom element adjacent to each other (hereinafter, referred to as "adjacent boom elements") by inserting the B pin into a fixing hole provided at an appropriate position of the outer boom element. On the other hand, the boom connecting means releases the connection between the adjacent boom elements by removing the B pin from the fixing hole. The boom connecting means maintains an expanded state of the expandable boom expanded by the single-cylinder expansion device. Such a boom connecting means is indispensable means for the single-cylinder expansion device.

The connecting pin driving means (hereinafter, referred to as "B-pin driving means") is disposed in a movable part of the expandable cylinder. The B-pin driving means moves the B pin provided on the inner boom element in target adjacent boom elements (adjacent boom elements including a boom element to be expanded and contracted). The B-pin driving means shifts states of the adjacent boom elements from the connected state to the released state (also referred to as a disconnected state) or from the released state to the connected state. Similarly to the boom connecting means, the B-pin driving means is indispensable means for the single-cylinder expansion device. The B-pin driving means includes a B-pin cylinder for moving the B pin. The B-pin cylinder is disposed in a narrow space of the movable part of the expandable cylinder. Since such a B-pin cylinder requires a relatively large output, the B-pin cylinder is constituted by a hydraulic cylinder.

The cylinder-boom connecting means is disposed in the movable part of the expandable cylinder. The cylinder-boom connecting means includes a connecting pin (hereinafter, referred to as a "C pin") for connecting the movable part of the expandable cylinder and a target boom element (boom element to be expanded and contracted). The cylinder-boom connecting means selectively connects the movable part of the expandable cylinder and the boom element by inserting the C pin into the connecting hole of the boom element to be expanded and contracted. The cylinder-boom connecting means releases the connection between the movable part of the expandable cylinder and the boom element by removing the C pin from the connecting hole of the boom element to be expanded and contracted. The cylinder-boom connecting means is indispensable means for the single-cylinder expansion device that expands and contracts all the boom elements by the single expandable cylinder. The cylinder-boom connecting means includes C-pin driving means such as a C-pin cylinder for moving the C pin. The C-pin cylinder is disposed in a narrow space of the movable part of the expandable cylinder. Since such a C-pin cylinder requires a relatively large output, the C-pin cylinder is constituted by a hydraulic cylinder.

FIG. 10 is an example of a hydraulic circuit of a hydraulic supply unit 3 of the related art for supplying a working fluid to a B-pin cylinder 1 and a C-pin cylinder used in a single-cylinder expansion device. The B-pin cylinder 1 drives a B pin 4. Such a B-pin cylinder 1 is a single-acting hydraulic cylinder. The B-pin cylinder 1 has a compression coil spring 5 that is returned into the cylinder. A working fluid is supplied to the B-pin cylinder 1 via one hydraulic pipeline 6. The C-pin cylinder 2 drives a C pin 7. Such a C-pin cylinder 2 is a single-acting cylinder. The C-pin cylinder 2 is returned to a contraction side by an extension coil spring 8 that biases a C-pin driving lever 21. A working fluid is supplied to the C-pin cylinder 2 via one hydraulic pipeline 9.

A working fluid is supplied to a movable part 11 of an expandable cylinder from a fixed part side 10 of the expandable cylinder via a hydraulic hose 13. One end of the expandable cylinder is supported on the fixed part side 10 of the expandable cylinder. The hydraulic hose 13 is one long hose delivered from a hose reel 12. In an expansion and contraction step of the single-cylinder expansion device, the B-pin cylinder 1 and the C-pin cylinder 2 are driven in a predetermined order. Thus, a first electromagnetic switching valve 14 is disposed on the fixed part side 10 of the expandable cylinder. A second electromagnetic switching valve 15 and a third electromagnetic switching valve 16 are arranged in the movable part 11 of the expandable cylinder. A controller 18 disposed on a slewing frame (the fixed part side 10 of the expandable cylinder) sends a control signal to the second electromagnetic switching valve 15 and the third electromagnetic switching valve 16 via a cable reel 17 and a control signal line 19.

CITATION LIST

Patent Literature

Patent Literature 1: JP 2002-332194 A

SUMMARY OF THE INVENTION

Problems to be Solved by the Invention

However, in the case of the expansion device for the expandable boom as described above, when a viscosity of the working fluid increases at a low temperature, since a pressure loss in the hydraulic hose 13 increases, operations of the B-pin cylinder 1 and the C-pin cylinder 2 are delayed. Thus, there is a possibility that the operations of the B-pin driving means and the cylinder-boom connecting means are delayed and thus, the single-cylinder expansion device is not normally operated. In order to avoid the operation delay at the low temperature, it is necessary to increase a size of the hydraulic hose 13 to suppress the pressure loss in the hydraulic hose 13. However, when the size of the hydraulic hose 13 is increased, the hose reel 12 becomes large. When the hose reel 12 becomes large, there is a possibility that it is difficult to secure a space for mounting the hose reel 12 on a crane vehicle.

On the other hand, there is also a method for incorporating the expandable cylinder in an oil feed pipe and supplying the working fluid from the fixed part side 10 of the expandable cylinder to the movable part 11 of the expandable cylinder via the oil feed pipe. However, the expandable cylinder with the built-in oil feed pipe has a complicated internal structure and is difficult to be manufactured. The expandable cylinder with the built-in oil feed pipe cannot solve the problem of securing operability at the low temperature. A technique of acquiring the working fluid pressurized based on an operation of the expandable cylinder from the expandable cylinder and accumulating the working fluid in a hydraulic accumulator has been known. However, in the case of such a technique, when the pressurized working fluid is accumulated in the hydraulic accumulator, the hydraulic accumulator is affected by an operation cycle of the expandable cylinder. An object of the present invention is to provide an expansion device that is not affected by an operation cycle of an expandable cylinder.

Solutions to Problems

An aspect of an expansion device according to the present invention is an expansion device that expands and contracts an expandable boom having a first boom element and a second boom element which expandably overlap each other. The device includes a first hydraulic source that discharges a first working fluid, an expandable cylinder that has a fixed part and a movable part movable with respect to the fixed part, is operated based on supply of the first working fluid, and moves the first boom element with respect to the second boom element in a stretching direction, a second hydraulic source that is provided in the movable part, discharges a second working fluid, and is a hydraulic source different from the first hydraulic source, a first connecting mechanism that is provided in the movable part, is operated based on supply of the second working fluid, and switches between a connected state and a disconnected state between the first boom element and the movable part, and a second connecting mechanism that is provided in the movable part, is operated based on the supply of the second working fluid, and switches between a connected state and a disconnected state between the first boom element and the second boom element.

Another aspect of a crane according to the present invention includes an expandable boom having a first boom element and a second boom element which expandably overlap each other, and the above-described expansion device.

Effects of the Invention

According to the present invention, it is possible to provide an expansion device that is not affected by an operation cycle of an expandable cylinder.

DESCRIPTION OF EMBODIMENTS

Hereinafter, an embodiment of the present invention will be described in detail with reference to the drawings.

Embodiment

An expansion device according to the embodiment of the present invention will be described with reference to FIG. 1.

Figure 1:
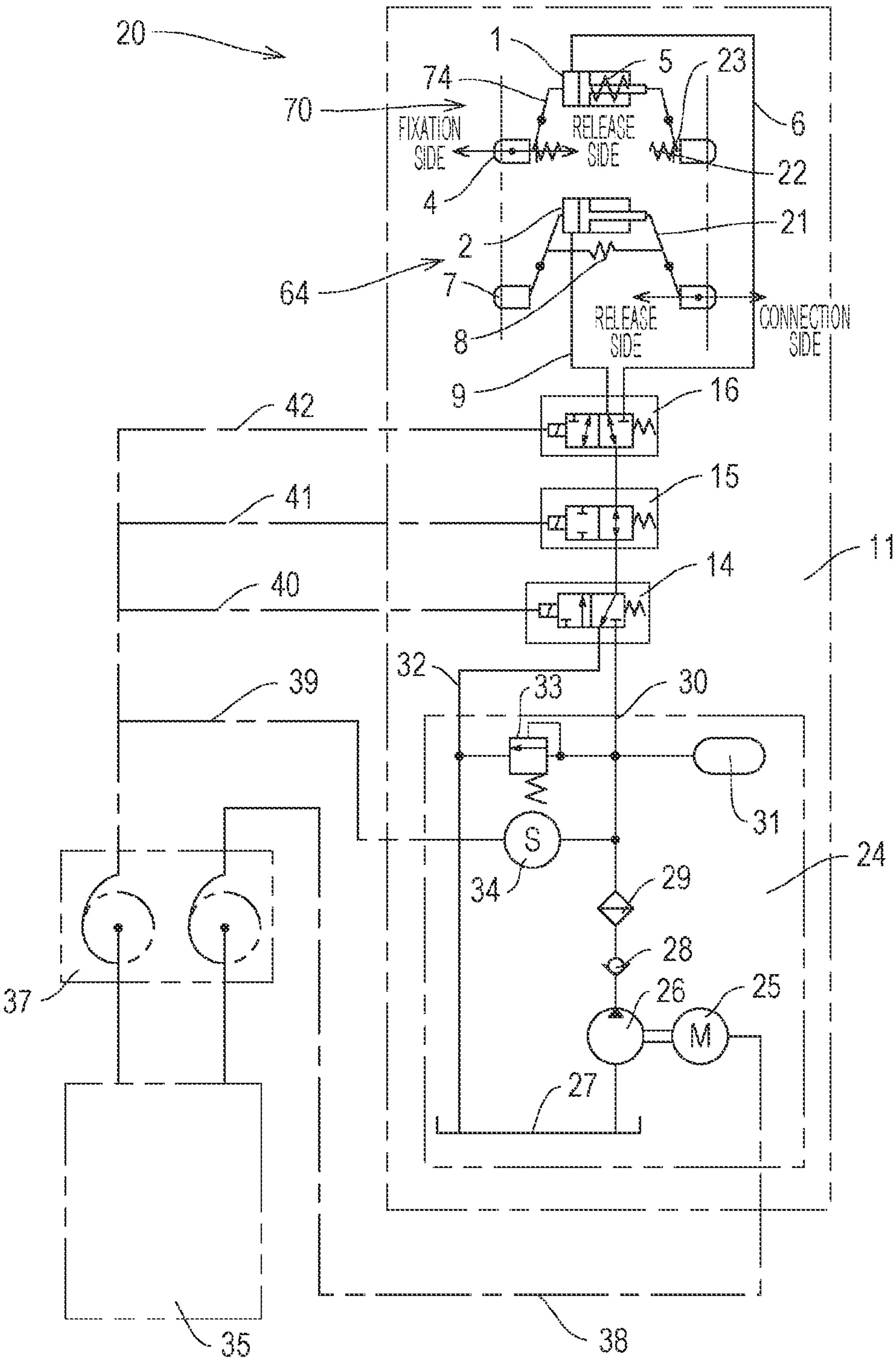
FIG. 1 is a hydraulic circuit diagram of a hydraulic supply unit in an expansion device according to an embodiment of the present invention.
Figure 10:
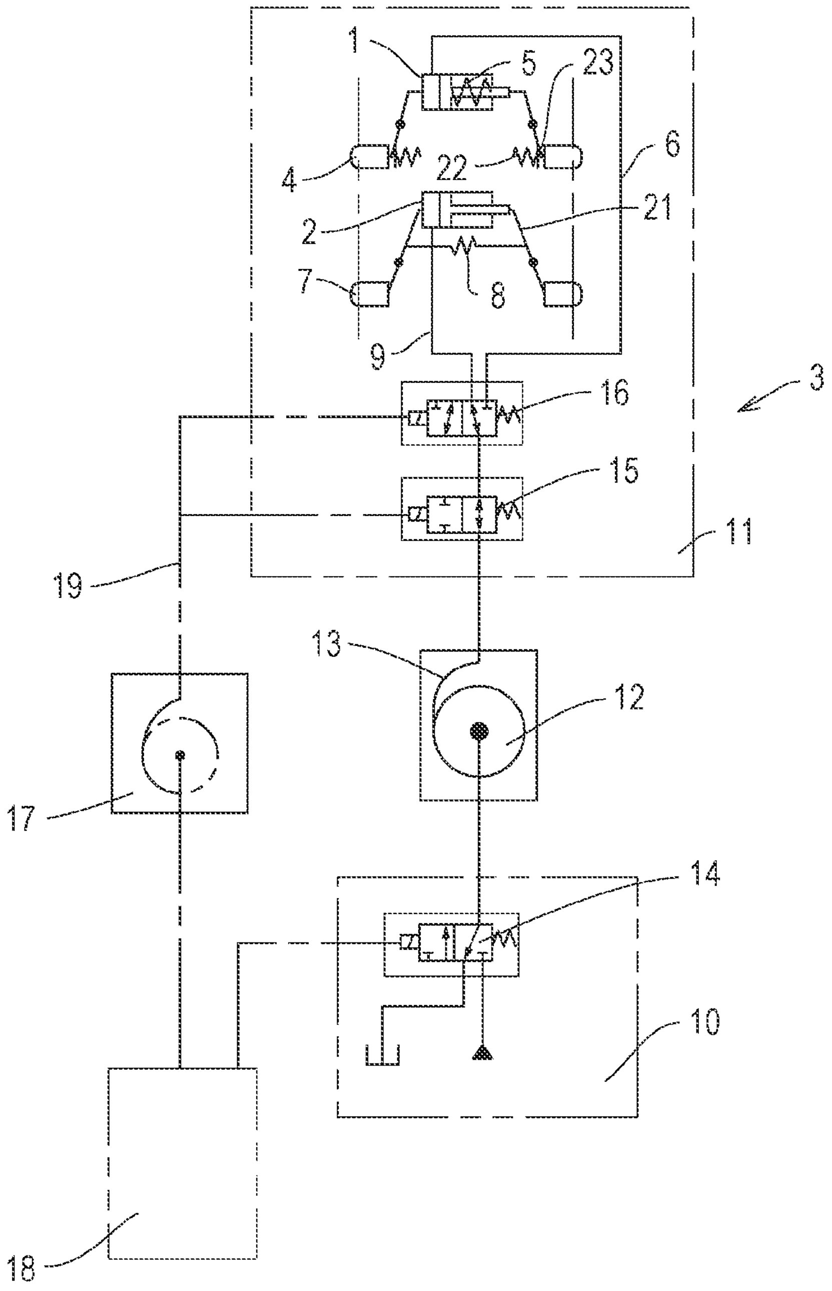
FIG. 10 is an example of a hydraulic circuit of the related art of a hydraulic supply unit.

FIG. 1 is a diagram illustrating an example of a hydraulic circuit of a hydraulic supply unit 20 included in the expansion device. In the description of the hydraulic supply unit 20 illustrated in FIG. 1, the same components as those of the hydraulic supply unit 3 of the related art illustrated in FIG. 10 will be described by using the same reference signs.

<Hydraulic Supply Unit>

As illustrated in FIG. 1, the hydraulic supply unit 20 includes cylinder-boom connecting means 64 and boom connecting means 70. The hydraulic supply unit 20 has a hydraulic unit 24, a first electromagnetic switching valve 14, a second electromagnetic switching valve 15, a third electromagnetic switching valve 16, and the like.

<Cylinder-Boom Connecting Means>

The cylinder-boom connecting means 64 has a C-pin cylinder 2. The C-pin cylinder 2 is disposed in a movable part 11 of an expandable cylinder 43 (see FIG. 2). The C-pin cylinder 2 inserts and removes a C pin 7 into and from a connecting hole of a target boom by moving the C pin 7. The cylinder-boom connecting means 64 corresponds to an example of a first connecting mechanism. The first connecting mechanism is operated based on the supply of a working fluid (also referred to as a second working fluid) discharged from the hydraulic supply unit 20, and switches between a connected state and a disconnected state between a boom element (for example, a second boom 52 illustrated in FIG. 2) to be moved and the expandable cylinder 43.

Specifically, the C-pin cylinder 2 selectively connects the movable part 11 of the expandable cylinder 43 and the boom by inserting the C pin 7 into the connecting hole of the boom. The C-pin cylinder 2 releases the connection between the movable part 11 and the boom by removing the C pin 7 from the connecting hole of the boom.

The C pin 7 is biased toward the connection side by an extension coil spring 8. The C-pin cylinder 2 and the C pin 7 are connected by a C-pin driving lever 21. The C-pin cylinder 2 is a single-acting hydraulic cylinder. A hydraulic pressure is supplied to the C-pin cylinder 2 from the hydraulic unit 24 (specifically, a hydraulic accumulator 31) to be described later via a hydraulic pipeline 9, and thus, the C-pin cylinder is expanded.

As a result, the C-pin cylinder 2 moves the C pin 7 to the release side. When the supply of the hydraulic pressure to the hydraulic pipeline 9 is blocked, the C-pin cylinder 2 is contracted by a biasing force of the extension coil spring 8. As a result, the C pin 7 moves to the connection side by the biasing force of the extension coil spring 8.

<Boom Connecting Means>

The boom connecting means 70 has a B-pin cylinder 1. The B-pin cylinder 1 is disposed in the movable part 11 of the expandable cylinder 43. The B-pin cylinder 1 connects 12) a pair of adjacent booms by moving a B pin 4 of a target boom. The boom connecting means 70 corresponds to an example of a second connecting mechanism. The second connecting mechanism is operated based on the supply of a working fluid (also referred to as a second working fluid) discharged from the hydraulic supply unit 20, and switches between a connected state and a disconnected state between a first boom element (for example, the second boom 52 illustrated in FIG. 2) and a second boom element (for example, a base boom 51).

The B-pin cylinder 1 is biased toward the contraction side by a compression coil spring 5 built in the B-pin cylinder 1. The B-pin cylinder 1 is a single-acting hydraulic cylinder. The B pin 4 is biased toward the fixation side by a compression coil spring 22.

The B-pin cylinder 1 and the B pin 4 are connected by a B-pin driving lever 74. When the movable part 11 of the expandable cylinder 43 moves alone, the connection between the B-pin driving lever 74 and the B pin 4 can be released. A hydraulic pressure is supplied to the B-pin cylinder 1 from the hydraulic unit 24 (specifically, the hydraulic accumulator 31) to be described later via one hydraulic pipeline 6, and thus, the B-pin cylinder is expanded.

The expanded B-pin cylinder 1 moves the B pin 4 to the release side. When the supply of the hydraulic pressure to the hydraulic pipeline 6 is blocked, the B-pin cylinder 1 is contracted by a biasing force of the compression coil spring 5. As a result, the B pin 4 is driven toward the fixation side by a biasing force of the compression coil spring 22.

<Hydraulic Unit>

As illustrated in FIG. 1, the hydraulic unit 24 is mounted on the movable part 11 of the expandable cylinder 43. The hydraulic unit 24 has an electric motor 25, a hydraulic pump 26, a tank 27, a hydraulic accumulator 31, a hydraulic sensor 34, and the like.

The hydraulic unit 24 has a discharge pipeline 30 and a return pipeline 32. In such a hydraulic unit 24, as an example, the elements constituting the hydraulic unit 24 are arranged in a housing (not illustrated) and are unitized.

The elements constituting the hydraulic unit 24 enter a state in which the working fluid can flow or are electrically connected to each other. The hydraulic unit 24 corresponds to an example of a second hydraulic source. The working fluid discharged from the hydraulic unit 24 corresponds to an example of the second working fluid.

The electric motor 25 drives the hydraulic pump 26 under the control of a control unit (specifically, a controller 35). When the hydraulic pump is driven by the electric motor 25, the hydraulic pump 26 sucks up the working fluid stored in the tank 27 from a suction port. The hydraulic pump 26 discharges the sucked working fluid from the discharge port. The working fluid discharged from the discharge port of the hydraulic pump 26 flows into the discharge pipeline 30 via a check valve 28 and a high-pressure filter 29. A pipe connecting the hydraulic pump 26 and the tank 27 corresponds to an example of a first pipe.

A relief valve 33 is provided between the discharge pipeline 30 and the return pipeline 32. The relief valve 33 decides a maximum pressure of the discharge pipeline 30. That is, when a pressure in the discharge pipeline 30 becomes larger than a predetermined threshold value, the relief valve 33 causes the discharge pipeline 30 and the return pipeline 32 to be fluidly communicatively connected with each other, and causes the working fluid in the discharge pipeline 30 to flow to the return pipeline 32.

The hydraulic accumulator 31 is connected to the discharge pipeline 30. The hydraulic accumulator 31 absorbs the working fluid in the discharge pipeline 30 and accumulates the pressure. A pipe connecting the hydraulic accumulator 31 and the hydraulic pump 26 corresponds to an example of a second pipe. The second pipe may include the valve (for example, the check valve 28) and the filter (For example, the high-pressure filter 29).

The hydraulic sensor 34 is connected to the discharge pipeline 30. The hydraulic sensor 34 measures the pressure of the discharge pipeline 30.

As illustrated in FIG. 1, the first electromagnetic switching valve 14, the second electromagnetic switching valve 15, and the third electromagnetic switching valve 16 are arranged in the movable part 11 of the expandable cylinder 43. The first electromagnetic switching valve 14, the second electromagnetic switching valve 15, and the third electromagnetic switching valve 16 are connected in series.

The first electromagnetic switching valve 14, the second electromagnetic switching valve 15, and the third electromagnetic switching valve 16 constitute a switching valve unit. The switching valve unit switches between a state in which the working fluid is supplied from the hydraulic unit 24 to the B-pin cylinder 1 or the C-pin cylinder 2 and a state in which the working fluid in the B-pin cylinder 1 or the working fluid in the C-pin cylinder 2 is returned to the tank 27 according to the states of the first electromagnetic switching valve 14, the second electromagnetic switching valve 15, and the third electromagnetic switching valve 16. The switching valve unit corresponds to an example of a switching valve.

A state in which the working fluid is supplied from the hydraulic unit 24 to the B-pin cylinder 1 is referred to as a first supply state of the hydraulic supply unit 20 (hereinafter, may be simply referred to as a first supply state). A state in which the working fluid is supplied from the hydraulic unit 24 to the C-pin cylinder 2 is referred to as a second supply state of the hydraulic supply unit 20 (hereinafter, may be simply referred to as a second supply state). A state in which the working fluid in the B-pin cylinder 1 is returned to the tank 27 is referred to as a first discharge state of the hydraulic supply unit 20 (hereinafter, may be simply referred to as a first discharge state). A state in which the working fluid in the C-pin cylinder 2 is returned to the tank 27 is referred to as a second discharge state of the hydraulic supply unit 20 (hereinafter, may be simply referred to as a second discharge state).

The first electromagnetic switching valve 14 is a 3-port 2-position switching valve. The discharge pipeline 30, the return pipeline 32, and the first connection pipeline connecting the first electromagnetic switching valve 14 and the second electromagnetic switching valve 15 are connected to the first electromagnetic switching valve 14.

Specifically, an end of the discharge pipeline 30 is connected to a first port of the first electromagnetic switching valve 14. An end of the return pipeline 32 is connected to a second port of the first electromagnetic switching valve 14. An end of the first connection pipeline is connected to a third port of the first electromagnetic switching valve 14.

The first electromagnetic switching valve 14 communicatively connects the second port and the third port in a first state (unenergized state). In the first state of the first electromagnetic switching valve 14, the working fluid flowing into the first electromagnetic switching valve 14 from the second electromagnetic switching valve 15 is returned to the tank 27.

The first electromagnetic switching valve 14 communicatively connects the first port and the third port in a second state (energized state). In the second state of the first electromagnetic switching valve 14, the working fluid flowing from the hydraulic unit 24 into the first electromagnetic switching valve 14 is supplied to the second electromagnetic switching valve 15.

The second electromagnetic switching valve 15 is a two-port two-position switching valve. The second electromagnetic switching valve 15 is provided between the first electromagnetic switching valve 14 and the third electromagnetic switching valve 16. Specifically, the end of the first connection pipeline is connected to a first port of the second electromagnetic switching valve 15.

An end of a second connection pipeline connecting the second electromagnetic switching valve 15 and the third electromagnetic switching valve 16 is connected to a second port of the second electromagnetic switching valve 15.

The second electromagnetic switching valve 15 communicatively connects the first port and the second port in a first state (unenergized state). In the first state of the second electromagnetic switching valve 15, the working fluid flows between the first connection pipeline and the second connection pipeline.

The second electromagnetic switching valve 15 blocks the first port and the second port in a second state (energized state). In the second state of the second electromagnetic switching valve 15, the flow of the working fluid is blocked between the first connection pipeline and the second connection pipeline.

The third electromagnetic switching valve 16 is a 3-port 2-position switching valve. The third electromagnetic switching valve 16 is provided between the B-pin cylinder 1 and the C-pin cylinder 2 and the second electromagnetic switching valve 15.

Specifically, the end of the second connection pipeline is connected to a first port of the third electromagnetic switching valve 16.

An end of a third connection pipeline connecting the third electromagnetic switching valve 16 and the B-pin cylinder 1 is connected to a second port of the third electromagnetic switching valve 16. An end of a fourth connection pipeline connecting the third electromagnetic switching valve 16 and the C-pin cylinder 2 is connected to a third port of the third electromagnetic switching valve 16.

The third electromagnetic switching valve 16 communicatively connects the first port and the third port in a first state (unenergized state). In the first state of the third electromagnetic switching valve 16, the working fluid flowing from the second electromagnetic switching valve 15 into the third electromagnetic switching valve 14 is supplied to the C-pin cylinder 2.

The third electromagnetic switching valve 16 communicatively connects the first port and the second port in a second state (energized state). That is, in the second state of the third electromagnetic switching valve 16, the working fluid flowing from the second electromagnetic switching valve 15 into the third electromagnetic switching valve 14 is supplied to the B-pin cylinder 1.

Hereinafter, a relationship between the states of the first electromagnetic switching valve 14, the second electromagnetic switching valve 15, and the third electromagnetic switching valve 16, the first supply state, the second supply state, the first discharge state, and the second discharge state will be described.

In the first supply state, the first electromagnetic switching valve 14 is in the second state (energized state), the second electromagnetic switching valve 15 is in the first state (unenergized state), and the third electromagnetic switching valve 16 is in the second state (energized state).

In the second supply state, the first electromagnetic switching valve 14 is in the second state (energized state), the second electromagnetic switching valve 15 is in the first state (unenergized state), and the third electromagnetic switching valve 16 is in the first state (unenergized state).

In the first discharge state, the first electromagnetic switching valve 14 is in the first state (unenergized state), the second electromagnetic switching valve 15 is in the first state (unenergized state), and the third electromagnetic switching valve 16 is in the second state (energized state).

In the second discharge state, the first electromagnetic switching valve 14 is in the first state (unenergized state), the second electromagnetic switching valve 15 is in the first state (unenergized state), and the third electromagnetic switching valve 16 is in the first state (unenergized state).

The controller 35 is disposed at a slewing platform of a crane vehicle (a fixed part side of the expandable cylinder 43). The electric motor 25 is connected to the controller 35 via a cable reel 37 and a power line 38 wound around the cable reel 37. The power line 38 corresponds to an example of a cable. The power line 38 is delivered from the cable reel 37 as a cylinder tube 44 (movable part, see FIG. 2) of the expandable cylinder 43 moves.

The hydraulic sensor 34, the first electromagnetic switching valve 14, the second electromagnetic switching valve 15, and the third electromagnetic switching valve 16 are connected to the controller 35 via the cable reel 37 and control signal lines 39, 40, 41, and 42.

A function of the hydraulic unit 24 of the hydraulic supply unit 20 (see FIG. 1) is as follows. The hydraulic pump 26 is rotated by the electric motor 25. The hydraulic pump 26 sucks the working fluid from the tank 27. The hydraulic pump 26 discharges the working fluid to the discharge pipeline 30 via the check valve 28 and the high-pressure filter 29. The working fluid in the discharge pipeline 30 is absorbed and accumulated in the hydraulic accumulator 31.

When the pressure of the discharge pipeline 30 becomes higher than a set pressure (also referred to as a first predetermined pressure), the relief valve 33 releases the working fluid in the discharge pipeline 30 to the return pipeline 32 by opening an internal passage. That is, the relief valve 33 enters an opened valve state when the pressure of the discharge pipeline 30 is higher than the first predetermined pressure. The relief valve 33 enters a closed valve state when the pressure of the discharge pipeline 30 is equal to or lower than the first predetermined pressure.

The hydraulic sensor 34 constantly measures the pressure of the discharge pipeline 30. The hydraulic sensor 34 transmits a detection signal to the controller 35. The discharge pipeline 30 corresponds to an example of a pipeline to which an accumulator is connected.

When the pressure of the discharge pipeline 30 rises to an upper limit set pressure of the relief valve 33, the controller 35 stops the power transmission to the electric motor 25. The electric motor 25 stops rotating. As a result, the pressure rise in the discharge pipeline 30 and the hydraulic accumulator 31 is stopped.

The working fluids in the discharge pipeline 30 and the hydraulic accumulator 31 are confined by the first electromagnetic switching valve 14 and the check valve 28, and thus, the pressures are maintained.

When the working fluid accumulated in the hydraulic accumulator 31 is consumed by the operations of the B-pin cylinder 1 and the C-pin cylinder 2, the pressure of the discharge pipeline 30 drops. When the pressure of the discharge pipeline 30 becomes lower than a lower limit set pressure (also referred to as a second predetermined pressure), the controller 35 supplies power to the electric motor 25. The hydraulic pump 26 is rotated by the electric motor 25. As a result, the working fluid discharged from the hydraulic pump 26 flows into the discharge pipeline 30, and the pressure in the discharge pipeline 30 increases.

As stated above, the hydraulic pump 26 is intermittently rotated by the hydraulic sensor 34 and the controller 35 that monitor the pressure of the discharge pipeline 30. Accordingly, the pressures of the working fluids in the discharge pipeline 30 and the hydraulic accumulator 31 are constantly maintained at a pressure equal to or higher than the lower limit set pressure (second predetermined pressure) and equal to or lower than the upper limit set pressure (first predetermined pressure).

As described above, the hydraulic unit 24 can constantly supply the hydraulic pressure for driving the B-pin cylinder 1 and the C-pin cylinder 2. As the lower limit set pressure and the upper limit set pressure, pressures necessary and sufficient for driving the B-pin cylinder 1 and the C-pin cylinder 2 are selected.

The hydraulic supply unit 20 according to the present invention has the hydraulic unit 24 in the movable part 11 of the expandable cylinder 43. Since the hydraulic unit 24 supplies the hydraulic pressure to the B-pin cylinder 1 and the C-pin cylinder 2, there is no long hydraulic pipeline such as a hose reel or an oil feed pipe in the expandable cylinder. Thus, the operability of the B-pin cylinder 1 and the C-pin cylinder 2 at a low temperature is improved.

Since a large and heavy hose reel is not required, the mountability of the crane vehicle is improved. There is no need for the expandable cylinder that is complicated and difficult to be manufactured, such as the expandable cylinder with the built-in oil feed pipe.

The pressure accumulation in the hydraulic accumulator 31 in the hydraulic unit 24 is independent of an expansion and contraction step of the single-cylinder expansion device. Thus, the control (operation step) of the single-cylinder expansion device is independent of the control of the pressure accumulation of the hydraulic accumulator 31. That is, a degree of freedom of the control of the single-cylinder expansion device is high.

A hydraulic circuit (also referred to as a first hydraulic circuit, see FIG. 1) of the hydraulic supply unit 20 is a circuit independent of a hydraulic circuit (also referred to as a second hydraulic circuit) of the entire crane vehicle. The second hydraulic circuit may be regarded as a hydraulic circuit including an expandable cylinder hydraulic supply unit 105 (see FIG. 5). The first hydraulic circuit and the second hydraulic circuit are provided as independent hydraulic circuits. That is, the first hydraulic circuit and the second hydraulic circuit are not connected by a pipe or the like.

Thus, there is a low possibility that contaminants intrude into the hydraulic circuit of the hydraulic supply unit 20 from the outside. Since the hydraulic circuit of the hydraulic supply unit 20 is independent of the hydraulic circuit of the entire crane vehicle, a dedicated oil type can be used as the working fluid of the hydraulic supply unit 20. In other words, a type of an oil to be used in the hydraulic supply unit 20 may be an oil different from a type of an oil used in the hydraulic circuit of the entire crane vehicle.

Since the entire hydraulic supply unit 20 is collectively mounted on the movable part 11 of the expandable cylinder 43, it is possible to modularize the entire hydraulic supply unit 20.

The B-pin cylinder 1 and the C-pin cylinder 2 are operated intermittently during an expansion and contraction operation of the single-cylinder expansion device. Since a size of the B-pin cylinder 1 and a size of the C-pin cylinder 2 are small, a small amount of oil supplied by the hydraulic supply unit 20 is sufficient. Accordingly, the electric motor 25, the hydraulic pump 26, the hydraulic accumulator 31, and the like constituting the hydraulic unit 24 can be downsized.

In preparation for a failure, a plurality of electric motors 25 and a plurality of hydraulic pumps 26 may be provided in the hydraulic unit 24. In preparation for disconnection of a power supply line, a plurality of power supply lines connecting the controller 35 and the hydraulic supply unit 20 may be provided. A battery that supplies electricity to the electric motor 25 may be provided in the movable part 11 of the expandable cylinder 43. The number of batteries may be singular or plural.

In the present embodiment, an example in which the controller 35 that controls the entire single-cylinder expansion device controls the electric motor 25 of the hydraulic unit 24 has been described. That is, in the present embodiment, a control unit that controls the single-cylinder expansion device and the control unit that controls the electric motor 25 of the hydraulic unit 24 are common control units.

As an example, a controller dedicated to the electric motor 25 may be disposed inside the hydraulic unit 24. In other words, the control unit that controls the electric motor 25 may be provided separately from the control unit that controls the single-cylinder expansion device. The control unit of the electric motor 25 may be unitized together with the hydraulic unit 24.

Figure 2:
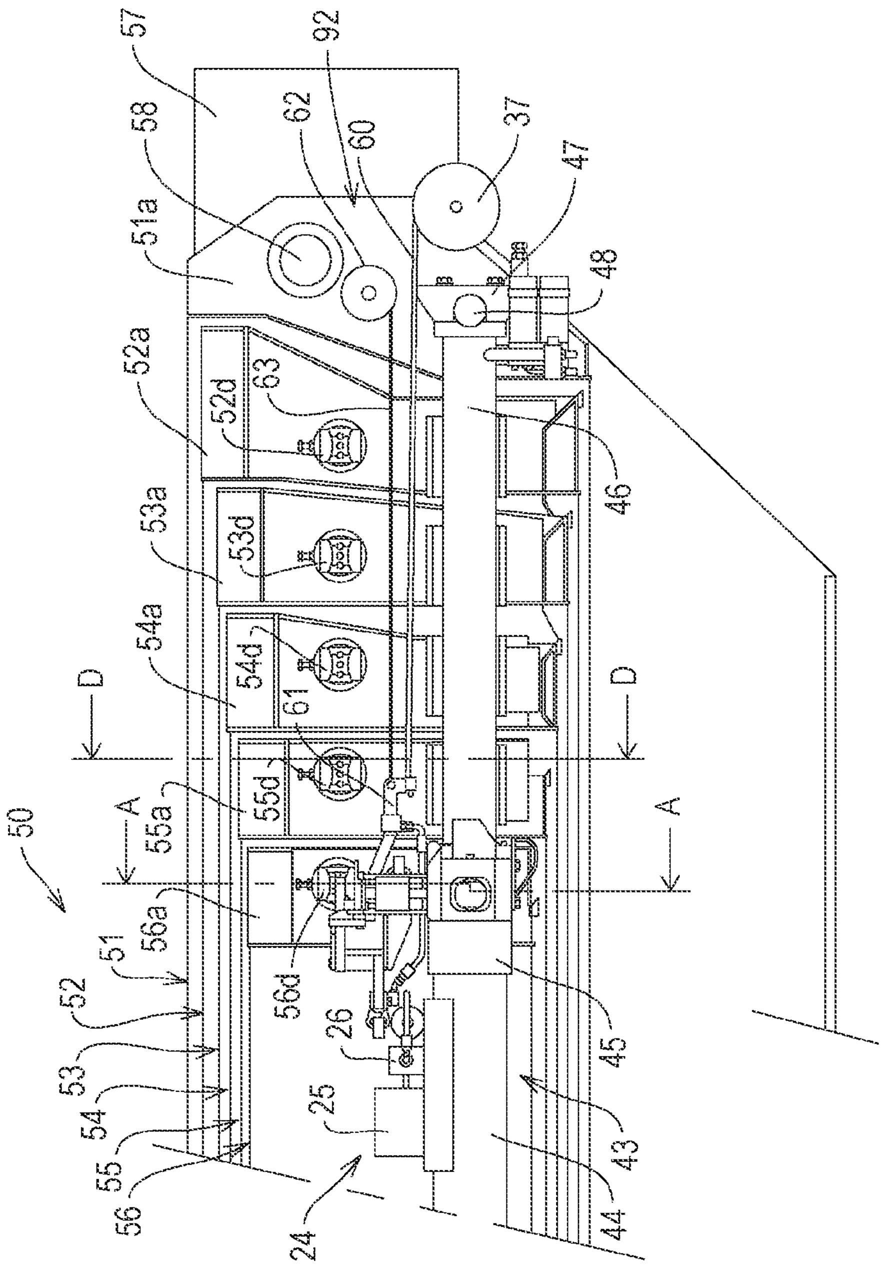
FIG. 2 is a cross-sectional view of a 6-stage expandable boom on which the expansion device is mounted.

An overall configuration of the expansion device according to the present embodiment will be described with reference to FIG. 2. FIG. 2 is a cross-sectional view illustrating an overall configuration of the expansion device according to the present embodiment. In FIG. 2, a base end of the expansion device mounted on a 6-stage expandable boom 50 in a fully contracted state is illustrated in a cross section along a longitudinal direction of the expandable cylinder 43. The expansion device according to the present embodiment does not need to include all the elements illustrated in FIG. 2.

As illustrated in FIG. 2, the expandable boom 50 has intermediate booms 52 to 55 (the second boom 52, a third boom 53, a fourth boom 54, and a fifth boom 55 in order from the outside) and a top boom 56 that are expandably combined in the base boom 51. The top boom 56 is disposed on the innermost side in an internal space of the base boom 51. Such an expandable boom 50 has a housing space therein.

The base boom 51 corresponds to an example of the second boom element. When the base boom 51 corresponds to an example of the second boom element, the intermediate boom (in the present embodiment, the second boom 52) disposed adjacent to the inner side of the base boom 51 corresponds to an example of the first boom element.

When the second boom 52 corresponds to an example of the second boom element, the third boom 53 corresponds to an example of the first boom element. When the third boom 53 corresponds to an example of the second boom element, the fourth boom 54 corresponds to an example of the first boom element. When the fourth boom 54 corresponds to an example of the second boom element, the fifth boom 55 corresponds to an example of the first boom element. When the fifth boom 55 corresponds to an example of the second boom element, the top boom 56 corresponds to an example of the first boom element.

The expandable cylinder 43 is provided in the housing space of the expandable boom 50. The expandable cylinder 43 has a cylinder tube 44 and a cylinder rod 46. The cylinder tube 44 corresponds to an example of the movable part (also referred to as a movable side member) of the expandable cylinder. The cylinder rod 46 corresponds to an example of a fixed part (also referred to as a fixation side member) of the expandable cylinder. The cylinder tube 44 may correspond to an example of the fixation side member of the expandable cylinder. In this case, the cylinder rod 46 may correspond to an example of the movable side member of the expandable cylinder.

The expandable cylinder 43 expands and contracts under the control of the controller 35. Specifically, when the working fluid is supplied from a tank T (see FIG. 5) to the inside of the cylinder tube 44, the cylinder tube 44 moves in a direction (hereinafter, referred to as an expansion direction) in which the entire expandable cylinder 43 expands with respect to the cylinder rod 46 under the control of the controller 35. In other words, when the working fluid is supplied, the expandable cylinder 43 expands under the control of the controller 35.

On the other hand, when the working fluid inside the cylinder tube 44 is discharged, the cylinder tube 44 moves in a direction in which the entire expandable cylinder 43 contracts (hereinafter, referred to as a contraction direction) with respect to the cylinder rod 46 under the control of the controller 35. In other words, when the working fluid is discharged, the expandable cylinder 43 contracts under the control of the controller 35.

The hydraulic unit 24 described above is mounted on the cylinder tube 44. Specifically, the hydraulic unit 24 is fixed to an outer peripheral surface of the cylinder tube 44. Such a hydraulic unit 24 includes the electric motor 25, the hydraulic pump 26, and the like described above.

The cable reel 37 is rotatably provided at a base boom base end 51*a*. A cable 60 is wound around the cable reel 37. The cable 60 has the power line 38, the control signal lines 39, 40, 41, and 42 (see FIG. 1), and the like. The cable 60 can be pulled out from the cable reel 37.

The cable 60 is connected to a support 61 of a cylinder tube rod side end 45. A length detector 62 (see FIG. 2) is provided at the base boom base end 51*a*. A cord 63 pulled out from the length detector 62 is connected to the support 61 of the cylinder tube rod side end 45.

Figure 3:
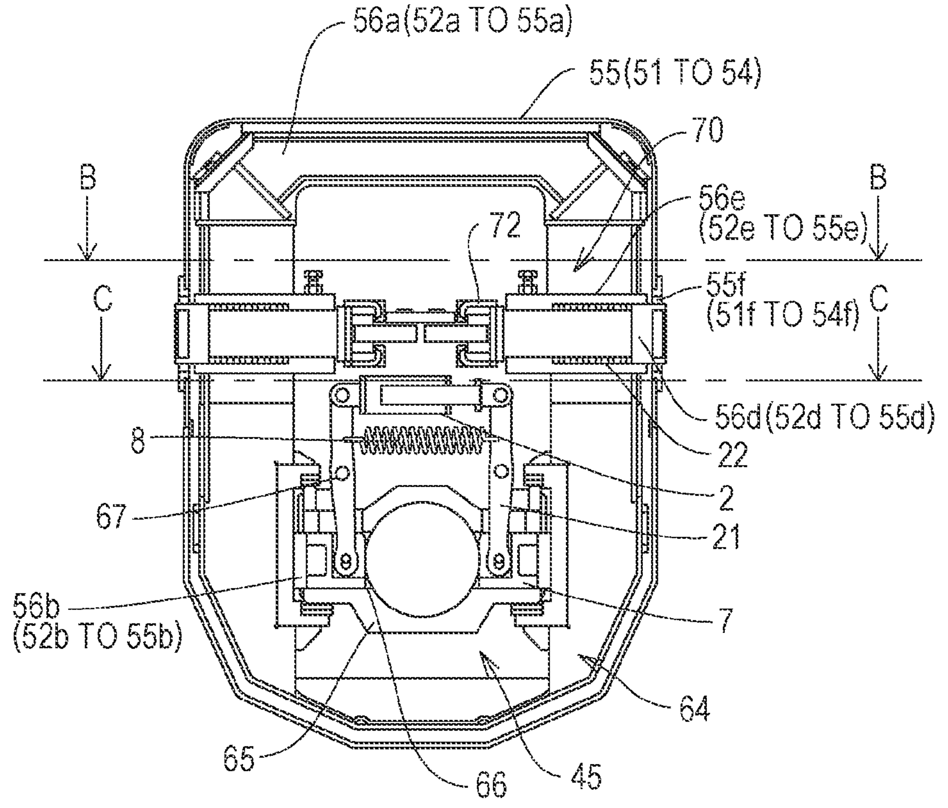
FIG. 3 is a cross-sectional view taken along a line A-A of FIG. 2.

Next, the cylinder-boom connecting means 64 in the expansion device will be described with reference to FIG. 3. FIG. 3 is a cross-sectional view taken along a line A-A of FIG. 2. FIG. 3 illustrates a case where the cylinder-boom connecting means 64 is positioned in a connecting hole 56*b* provided in a top boom base end 56*a*. Similarly to the top boom base end 56*a*, as illustrated in FIG. 3, connecting holes are also provided in a second boom base end 52*a*, a third boom base end 53*a*, a fourth boom base end 54*a*, and a fifth boom base end 55*a*, respectively.

As illustrated in FIG. 3, the cylinder-boom connecting means 64 has the C-pin cylinder 2, the C pin 7, the C-pin driving lever 21, and the like.

The C-pin cylinder 2 is provided at the cylinder tube rod side end 45. The C pin 7 is connected to the C-pin cylinder 2 via the C-pin driving lever 21. The C pin 7 is slidably assembled to a C-pin housing hole 66 of a trunnion member 65 constituting the cylinder tube rod side end 45.

The C pin 7 can be inserted into and removed from connecting holes 52*b* to 56*b* (in FIG. 3, the connecting hole 56*b* provided in the top boom base end 56*a*) provided in the boom base ends 52*a* to 56*a*.

A pair of the C pin 7 and the C-pin driving lever 21 are provided on the left and right of the expandable cylinder 43. The C-pin driving lever 21 is supported by a pin 67 on an integrally formed support (not illustrated) above the trunnion member 65. The C-pin driving lever 21 is swingable.

One end of the C-pin driving lever 21 is connected to the C pin 7. The C pin 7 is biased toward the connection side by the extension coil spring 8 via the C-pin driving lever 21.

Figure 4:
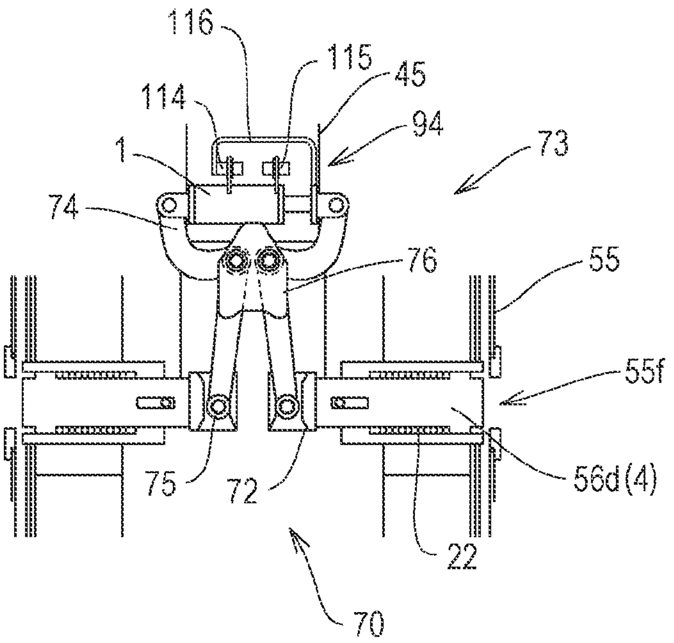
FIG. 4 is a diagram taken along an arrow B-B of FIG. 3.

The boom connecting means 70 in the expansion device will be described with reference to FIGS. 3 and 4. FIG. 3 is a cross-sectional view taken along a line A-A of FIG. 2. FIG. 4 is a diagram taken along an arrow B-B of FIG. 3. FIGS. 3 and 4 illustrate the boom connecting means 70 at a fixing portion between the top boom 56 and the fifth boom 55.

As illustrated in FIGS. 3 and 4, the boom connecting means 70 has B-pin driving means 73, B pins 56*d*, the compression coil spring 22, and the like.

The B pin 56*d* is a fixing pin for fixing the top boom 56 and the fifth boom 55. A pair of B pins 56*d* are provided on the left and right. Similarly, in the second boom base end 52*a*, the third boom base end 53*a*, the fourth boom base end 54*a*, and the fifth boom base end 55*a*, a pair of B pins 52*d* of the second boom 52, a pair of B pins 53*d* of the third boom 53, a pair of B pins 54*d* of the fourth boom 54, and a pair of B pins 55*d* of the fifth boom 55 are provided on the left and right, respectively (see FIG. 2).

The fifth boom 55 has fixing holes 55*f* through which the B pins 56*d* are inserted on a side surface. A plurality of fixing holes 55*f* is provided along a length direction according to an expansion length of the top boom 56. The arrangement of the fixing holes is substantially similar in the other booms (the base boom 51, the second boom 52, the third boom 53, and the fourth boom 54).

In the description of the overall configuration of the expansion device, the B pins corresponding to the booms will be described as the B pins 52*d* to 56*d*, but are the same as the B pin 4 described with reference to FIG. 1. That is, in FIG. 1, only the B pin for one stage of the boom is illustrated for the purpose of describing the outline of the hydraulic supply unit 20.

The B pin 56*d* is slidably assembled to a B-pin housing member 56*e* of the top boom base end 56*a*. The B pins 56*d* can be inserted into and removed from the fixing holes 55*f* provided on the side surface of the fifth boom 55. The B pin

56*d* is biased toward the fixation side by the compression coil spring 22 disposed on an outer peripheral portion of the B pin 56*d*.

The B pin 56*d* has a connecting member 72 at the inner end. The connecting member 72 has a box shape partially opened. The connecting member 72 can be connected to the B-pin driving lever 74 via a roller 75 of the B-pin driving means 73.

The B-pin driving means 73 has the B-pin cylinder 1, the B-pin driving lever 74, and the roller 75. The B-pin driving lever 74 is swingably supported by the support 76 provided at the cylinder tube rod side end 45 (the movable part 11 of the expandable cylinder 43). A pair of B-pin driving levers 74 are provided on the left and right.

The roller 75 is rotatably supported at one end of the B-pin driving lever 74. A rod side end and a cylinder side end of the B-pin cylinder are supported by the other ends of the B-pin driving levers 74, respectively. FIG. 4 illustrates a state in which the roller 75 is fitted in the connecting member 72 and the B pin 56*d* of the top boom 56 and the B-pin driving means 73 are connected.

The B-pin driving means 73 has an integral structure with the cylinder tube rod side end 45 illustrated in FIG. 2 as a whole. Thus, the B-pin driving means 73 can drive the selected B pin in a state in which the roller 75 is positioned in the connecting member 72 corresponding to the B pin selected from the B pins 52*d* to 56*d* provided at the base ends 52*a* to 56*a* of the booms according to the expansion and contraction of the expandable cylinder 43.

The connecting member 72 provided at an inner end of each of the B pins 52*d* to 56*d* has a box shape in which a part is opened. Thus, during the expansion and contraction operation of the expandable cylinder 43, the B-pin driving lever 74 passes through an opened portion of the connecting member 72 of the B pin that is not a driving target.

Figure 5:
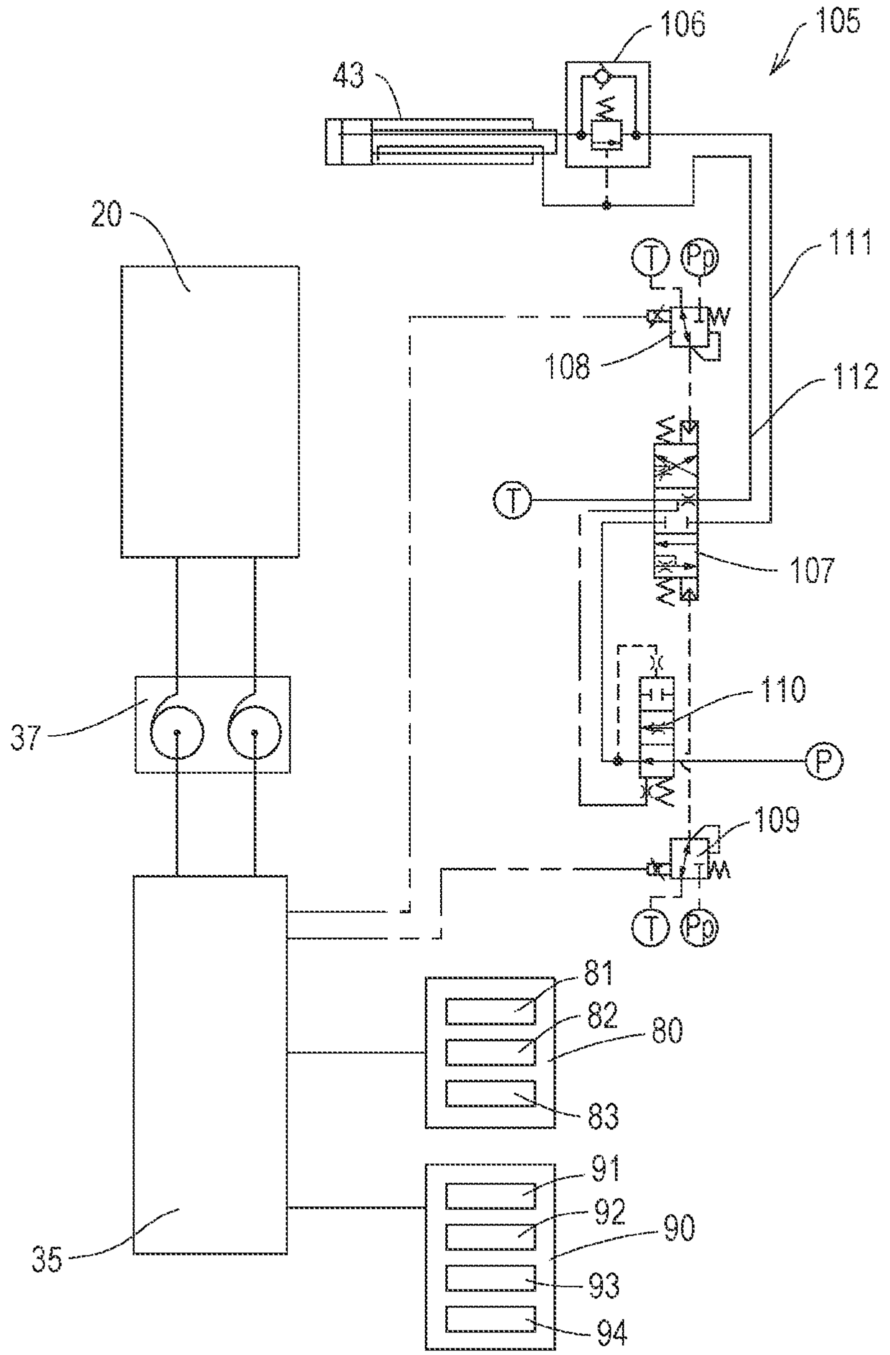
FIG. 5 is a control block diagram of the expansion device and a hydraulic circuit.

Next, a control block and the hydraulic circuit of the expansion device according to the present embodiment will be described with reference to FIG. 5. As illustrated in FIG. 5, the expansion device includes expansion and contraction operation means 80, expansion and contraction state detecting means 90, the controller 35, the hydraulic supply unit 20, and the expandable cylinder hydraulic supply unit 105.

The expansion and contraction operation means 80 has an expansion and contraction operation lever 81, final boom state input means 82, and an expansion and contraction information display means 83.

The expansion and contraction operation lever 81 converts a lever operation direction and an operation amount of an expansion and contraction operation into an electric signal and outputs the electric signal to the controller 35.

The final boom state input means 82 is used to input a target expanded state (final boom state) after the expansion and contraction operation when the expandable boom 50 is expanded and contracted. The final boom state input means 82 is operated integrally with the expansion and contraction information display means 83 to be described later. An operation signal of the final boom state input means 82 is output to the controller 35.

The expansion and contraction information display means 83 graphically displays information regarding an operation of the expansion device based on a display control signal from the controller 35.

Figure 6:
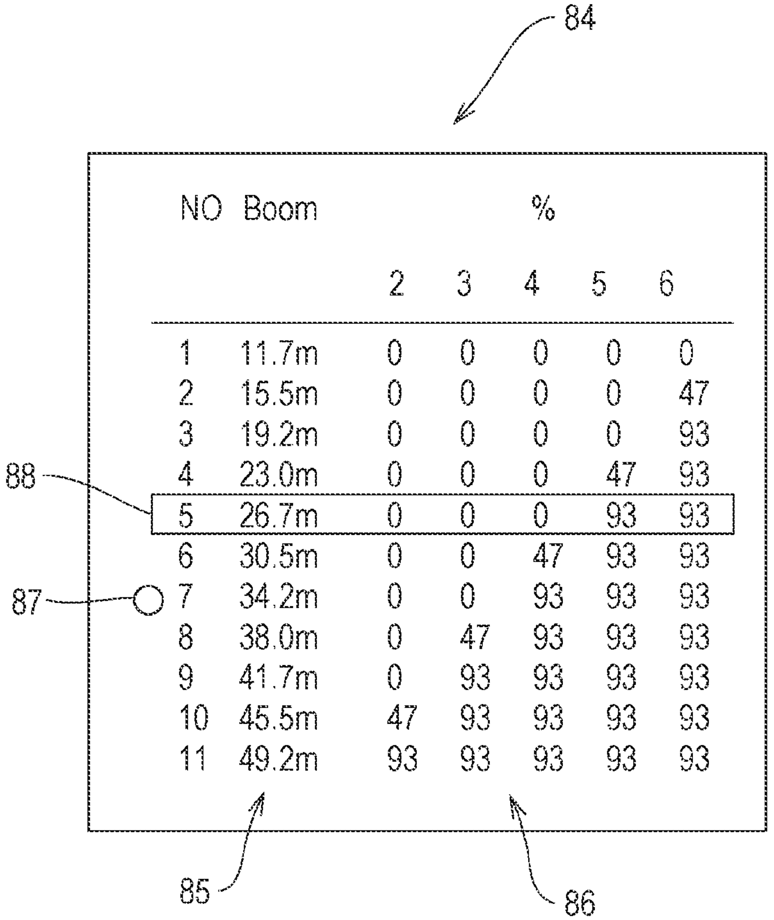
FIG. 6 is a display screen by expansion and contraction information display means.

FIG. 6 illustrates an example of a display screen 84 by the expansion and contraction information display means 83. Contents of the display screen 84 can be switched. A boom condition when the expandable boom 50 is expanded and contracted is displayed on the display screen 84.

The boom condition indicates a boom state after the expansion of the expandable boom 50, and an expansion length 85 of the expandable boom 50 and an expansion ratio 86 of each stage boom are associated with each other.

A plurality of boom conditions is displayed on the display screen 84. On the display screen 84, an operator can select a desired boom condition by operating a forward-backward key of the final boom state input means 82 to move a box-shaped cursor 88 up and down.

For example, the operator can input the boom condition to the controller 35 by moving the box-shaped cursor 88 to a row of a target boom condition and then operating a set key of the final boom state input means 82. In FIG. 6, the selected boom condition is indicated by a circle 87.

The expansion and contraction state detecting means 90 has the following specific detecting means. That is, the expansion and contraction state detecting means 90 has boom base end position detecting means 91, cylinder length detecting means 92, C-pin state detecting means 93, and B-pin state detecting means 94.

The boom base end position detecting means 91 detects the base end of the boom at which the cylinder-boom connecting means 64 is positioned, and outputs a detection signal to the controller 35.

The cylinder length detecting means 92 detects a cylinder length of the expandable cylinder 43 and outputs a detection signal to the controller 35.

The controller 35 acquires a specification expansion and contraction length set so as to correspond to a position of the fixing hole of the boom connecting means 70 based on a detection value of the cylinder length detecting means 92. The controller 35 sets the acquired specification expansion and contraction length as an expansion and contraction length in a boom expansion and contraction step. The specification expansion and contraction length may be stored in a storage unit (not illustrated) or the like.

The C-pin state detecting means 93 detects a state of the C pin 7 driven by the cylinder-boom connecting means 64, and outputs a detection signal to the controller 35.

The B-pin state detecting means 94 detects the states of the B pins 52*d* to 56*d* driven by the B-pin driving means 73, and outputs detection signals to the controller 35.

Figure 7:
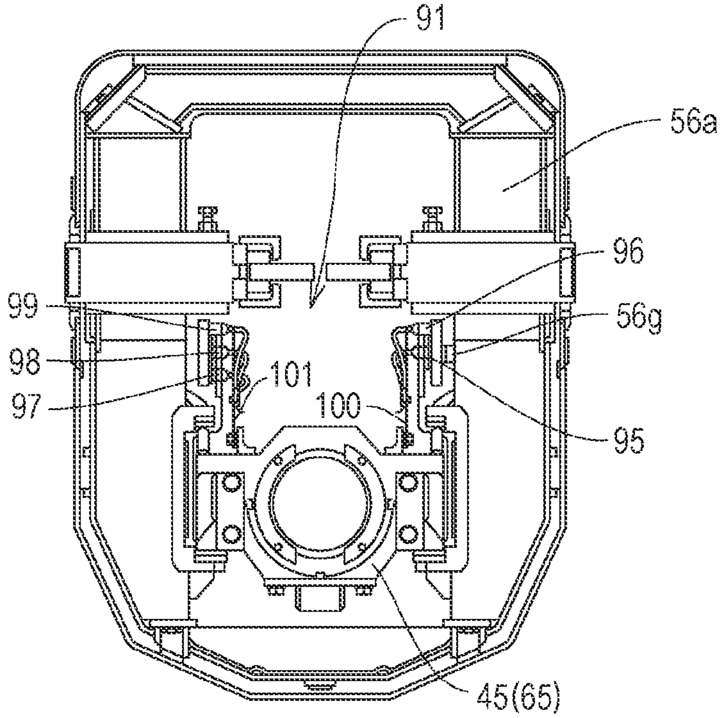
FIG. 7 is a diagram taken along an arrow D-D of FIG. 2.

FIG. 7 illustrates a specific example of the boom base end position detecting means 91. FIG. 7 is a diagram taken along an arrow D-D of FIG. 2. In FIG. 7, the boom base end position detecting means 91 includes proximity switches 95 to 99.

The proximity switches 95 to 99 are attached to the cylinder tube rod side end 45 (trunnion member 65) of the expandable cylinder 43 via supports 100 and 101.

A detection piece 56*g* is provided at a position corresponding to the proximity switch 95 at the top boom base end 56*a*. FIG. 7 illustrates a state in which the detection piece 56*g* of the top boom base end 56*a* is detected by the proximity switch 95.

Similarly, detection pieces 52*g* to 55*g* are provided at positions corresponding to the proximity switches 96 to 99 on the base ends 52*a* to 55*a* of the other booms, respectively.

The controller 35 can specify the connecting hole of the boom to which the C pin 7 of the cylinder-boom connecting means 64 is connected according to which of the proximity switches 95 to 99 detects the detection pieces 52*g* to 56*g*.

The cylinder length detecting means 92 includes, for example, the length detector 62 attached to the base boom base end 51*a* on the fixed part side of the expandable cylinder 43 (see FIG. 2). The cord 63 pulled out from the length detector 62 is connected to the support 61 of the cylinder tube rod side end 45 of the expandable cylinder 43.

The cord 63 is taken in and out from the length detector 62 along with the expansion and contraction of the expandable cylinder 43. The cylinder length detecting means 92 can detect the cylinder length of the expandable cylinder 43 based on a pulled-out amount of the cord 63.

Figure 8:
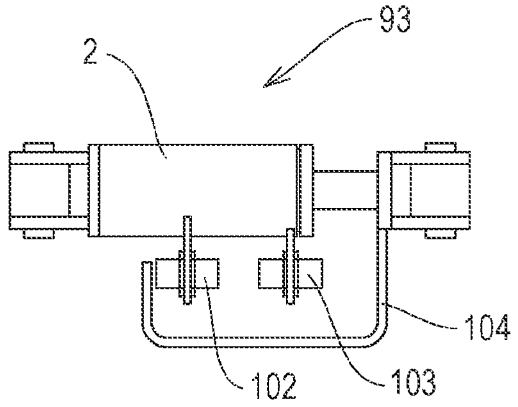
FIG. 8 is a diagram taken along an arrow C-C of FIG. 3.

FIG. 8 illustrates a specific example of the C-pin state detecting means 93. FIG. 8 is a diagram taken along an arrow C-C of FIG. 3. In FIG. 8, the C-pin state detecting means 93 includes proximity switches 102 and 103.

The proximity switches 102 and 103 are provided at a cylinder part of the C-pin cylinder 2. A U-shaped detection piece 104 is provided at a rod part of the C-pin cylinder 2. In a state in which the C pin 7 of the cylinder-boom connecting means 64 is removed from the connecting hole 56*b* of the top boom 56 (also referred to as a cylinder-boom disconnected state, see FIG. 3), one proximity switch 102 detects the detection piece 104.

When the maintaining of the expanded state of the C-pin cylinder 2 is released and a distal end of the C pin 7 is inserted into the connecting hole 56*b* by the biasing force of the extension coil spring 8 (see FIG. 3), the other proximity switch 103 detects the detection piece 104.

FIG. 4 illustrates a specific example of the B-pin state detecting means 94. In FIG. 4, the B-pin state detecting means 94 includes proximity switches 114 and 115.

The proximity switches 114 and 115 are provided at a cylinder part of the B-pin cylinder 1. A U-shaped detection piece 116 is provided at a rod part of the B-pin cylinder 1.

As illustrated in FIG. 4, one proximity switch 114 detects the detection piece 116 in a state in which a distal end of the B pin 56*d* of the top boom base end 56*a* is removed from the fixing hole 55*f* of the fifth boom 55 (also referred to as a boom disconnected state).

When the maintaining of the expanded state of the B-pin cylinder 1 is released, the B-pin cylinder 1 is contracted by the biasing force of the built-in compression coil spring 5 (see FIG. 1). When the distal end of the B pin 56*d* is inserted into the fixing hole 55*f* by the biasing force of the compression coil spring 22, the other proximity switch 115 detects the detection piece 116.

FIG. 5 illustrates the expandable cylinder hydraulic supply unit 105 that supplies the working fluid to the expandable cylinder 43, and the hydraulic supply unit 20 that supplies the working fluid to the C-pin cylinder 2 of the cylinder-boom connecting means 64 and the B-pin cylinder 1 of the B-pin driving means 73.

The expandable cylinder hydraulic supply unit 105 supplies the working fluid to the expandable cylinder 43 based on a control signal from the controller 35. The hydraulic supply unit 20 supplies the working fluid to one cylinder selected by the controller 35 out of the C-pin cylinder 2 and the B-pin cylinder 1 based on a control signal from the controller 35.

Hereinafter, the expandable cylinder hydraulic supply unit 105 will be described. Details of the hydraulic supply unit 20 are as described above with reference to FIG. 1, and thus, the description is omitted.

The expandable cylinder hydraulic supply unit 105 has a counterbalance valve 106, a pilot type switching valve 107, an electromagnetic proportional valve 108, an electromagnetic proportional valve 109, and a flow control valve 110.

A hydraulic source P is connected to a pump port of the pilot type switching valve 107 via the flow control valve 110. The tank T is connected to a tank port of the pilot type switching valve 107. The hydraulic source P is provided around the base boom base end 51*a*. A position of the hydraulic source P is not limited to the case of the present embodiment. The hydraulic source P corresponds to an example of a first hydraulic source. A working fluid discharged from the hydraulic source P corresponds to an example of a first working fluid.

The electromagnetic proportional valves 108 and 109 are proportionally controlled by a control signal from the controller 35. The pilot type switching valve 107 is switched by output pilot pressures of the electromagnetic proportional valves 108 and 109.

A first outlet port of the pilot type switching valve 107 and an expansion side oil chamber of the expandable cylinder 43 are connected by a hydraulic pipeline 111 via the counterbalance valve 106. A second outlet port of the pilot type switching valve 107 and a contraction side oil chamber of the expandable cylinder 43 are connected by a hydraulic pipeline 112.

Hereinafter, the operation of the expansion device according to the present embodiment will be described with reference to FIGS. 1 to 8. Specifically, an expansion operation of the expansion device from the fully contracted state of the 6-stage expandable boom 50 (see FIG. 2) to a state in which the top boom 56 and the fifth boom 55 of the crane vehicle 113 are expanded (see FIG. 9) will be described as an example. In the following description, the top boom 56 corresponds to an example of an inner boom. The fifth boom 55 corresponds to an example of an outer boom.

At the start of the expansion operation, the expandable boom 50 is in the fully contracted state as illustrated in FIG. 2. At this time, the cylinder-boom connecting means 64 is connected to the base end 56*a* of the top boom 56. All of the pair of adjacent booms are fixed by the boom connecting means 70. The B-pin driving means 73 is connected to the B pin 56*d* of the top boom 56.

First, the operator selects the boom condition on the display screen 84 of the expansion and contraction information display means 83 by operating the forward-backward key of the final boom state input means 82. As an example, when the operator selects boom condition No. 5 (see FIG. 6) in which the top boom (sixth stage) is expanded by 93% and the fifth boom (fifth stage) is expanded by 93% and operates the set key of the final boom state input means 82, the selected boom condition is output to the controller 35 and is stored. Hereinafter, the boom condition selected by the operator is referred to as a selected boom condition.

Subsequently, the operator operates the expansion and contraction operation lever 81 to the expansion side and maintains the operation state. The controller 35 automatically controls the expansion device to expand the expandable boom 50 until the selected boom condition (in this example, boom condition No. 5 of FIG. 6) is satisfied. At this time, the controller 35 repeatedly performs the following plurality of steps as one cycle until the selected boom condition is satisfied.

Specifically, in the above one cycle, the controller 35 sequentially performs a boom disconnection step, a boom expansion and contraction step (here, a boom expansion step), a boom connection step, a cylinder-boom disconnection step, an expandable cylinder contraction step, and a cylinder-boom connection step. When the operator returns the expansion and contraction operation lever 81 to a neutral position in the middle of the expansion and contraction operation of the expandable boom 50, the controller 35 stops the operation of the expansion device.

(Boom Disconnection Step)

The boom disconnection step has a step of moving the B pin 4 to disconnect the pair of adjacent booms (hereinafter, referred to as a first step of the boom disconnection process) and a step of maintaining the B pin 4 at a moved position (hereinafter, referred to as a second step of the boom disconnection step).

First, in the first step of the boom disconnection step, the controller 35 outputs a control signal instructing the hydraulic supply unit 20 to remove the B pin 56*d* of the top boom 56 from the fifth boom 55 (to expand the B-pin cylinder 1) based on an operation of the operator on the expansion and contraction operation lever 81. Specifically, the controller 35 outputs a control signal for turning on energization to the first electromagnetic switching valve 14, turning off energization to the second electromagnetic switching valve 15, and turning on energization to the third electromagnetic switching valve 16.

In the first step of the boom disconnection step, the first electromagnetic switching valve 14 is in the second state (energized state). In the boom disconnection step, the second electromagnetic switching valve 15 is in the first state (unenergized state). In the boom disconnection step, the third electromagnetic switching valve 16 is in the second state (energized state).

The working fluid of the hydraulic unit 24 (the pressurized working fluid accumulated in the hydraulic accumulator 31) is supplied to the B-pin cylinder 1 through the first electromagnetic switching valve 14, the second electromagnetic switching valve 15, the third electromagnetic switching valve 16, and the hydraulic pipeline 6. The B-pin cylinder 1 is driven to the expansion side while compressing the built-in compression coil spring 5, and moves the B pin 4 to the release side.

An operation of the boom connecting means 70 in the first step of the boom disconnection step will be described with reference to FIG. 4. The B-pin cylinder 1 expands, and thus, the B-pin driving lever 74 is moved to the release side. The B pin 56*d* of the top boom 56 retreats against the biasing force of the compression coil spring 22 and is removed from the fixing hole 55*f*. The controller 35 recognizes that the fixing between the pair of adjacent booms is released based on a detection signal from the proximity switch 115 of the B-pin state detecting means 94.

Subsequently, in the second step of the boom disconnection step, the controller 35 outputs a control signal for turning off the energization to the first electromagnetic switching valve 14, turning on the energization to the second electromagnetic switching valve 15, and turning on the energization to the third electromagnetic switching valve 16.

In the second step of the boom disconnection step, the first electromagnetic switching valve 14 is in the first state (unenergized state). In the second step of the boom disconnection step, the second electromagnetic switching valve 15 is in the second state (energized state). In the second step of the boom disconnection step, the third electromagnetic switching valve 16 is in the second state (energized state).

In the second step of the boom disconnection step, the working fluid is retained in the hydraulic pipeline 6 between the second electromagnetic switching valve 15 and the B-pin cylinder 1. In this state, the expanded state of the B-pin cylinder 1 is maintained. That is, the B pin 56*d* is maintained in a state of being removed from the fixing hole 55*f* of the fifth boom 55.

As stated above, the fixed state between the top boom base end 56*a* and the fifth boom 55 is released. When the boom disconnection step is ended, the step proceeds to the next boom expansion step.

Since the hydraulic pipeline 6 from the hydraulic unit 24 to the B-pin cylinder 1 is very short, the hydraulic pipeline is hardly affected by a viscosity change due to a temperature decrease. As a result, very good responsiveness is obtained in the boom disconnection step.

(Boom Expansion Step)

In the boom expansion step, the controller 35 outputs a control signal instructing the expandable cylinder hydraulic supply unit 105 to expand the expandable cylinder 43. Specifically, the controller 35 outputs a control signal to the electromagnetic proportional valve 109 such that a pilot pressure proportional to an operation amount of the expansion and contraction operation lever 81 is applied to the pilot type switching valve 107.

The hydraulic source P is connected to the pilot type switching valve 107, and the hydraulic pressure from the hydraulic source P is sent to the expansion side oil chamber of the expandable cylinder 43 via the hydraulic pipeline 111 and the counterbalance valve 106. The expandable cylinder 43 expands. As the expandable cylinder 43 expands, the top boom 56 expands.

In this boom expansion step, the controller 35 calculates a distance (hereinafter, referred to as a first distance) between the B pin 56*d* of the top boom 56 connected to the B-pin driving means 73 and the fixing hole of the fifth boom 55 based on a detection signal from the cylinder length detecting means 92. The fixing hole of the fifth boom 55 is a fixing hole into which the B pin 56*d* of the top boom 56 connected to the B-pin driving means 73 is inserted in the boom connection step to be described later.

In the boom expansion step, the first distance calculated by the controller 35 is a distance of the expandable boom 50 in an axial direction. When the first distance is equal to or less than a predetermined distance, the controller 35 outputs a signal (hereinafter, also simply referred to as a deceleration signal) for decelerating an expansion speed (that is, a moving speed of the cylinder tube 44) of the expandable cylinder 43 to the expandable cylinder hydraulic supply unit 105. The case where the first distance is equal to or less than the predetermined distance may be regarded as a case where the B pin 56*d* reaches a deceleration start point.

Specifically, in the boom expansion step, the cylinder length detecting means 92 continues to send a detection signal indicating the length of the expandable cylinder 43 to the controller 35. When the B pin 56*d* reaches the deceleration start point, the controller 35 gradually decreases an output signal value to the electromagnetic proportional valve 109. That is, when the B pin 56*d* reaches the deceleration start point, the controller 35 outputs a control signal (also referred to as a first deceleration control signal) for gradually reducing the expansion speed of the expandable cylinder 43 to the electromagnetic proportional valve 109.

Thus, the pilot pressure applied from the electromagnetic proportional valve 109 to the pilot type switching valve 107 gradually decreases in response to the first deceleration control signal. As a result, a spool of the pilot type switching valve 107 is gradually returned.

As the spool of the pilot type switching valve 107 is gradually returned, an opening area of the first outlet port of the pilot type switching valve 107 gradually decreases. As a result, a flow rate of the working fluid discharged from the first outlet port of the pilot type switching valve 107 decreases. Accordingly, the expansion speed of the expandable cylinder 43 decreases.

When it is determined that the B pin 56*d* of the top boom 56 has reached the position of the fixing hole to be inserted in the boom connection step to be described later, the controller 35 stops an expansion operation of the expandable cylinder 43. When the boom expansion step is ended, the step proceeds to the next boom connection step.

(Boom Connection Step)

In the boom connection step, the controller 35 outputs a control signal instructing the hydraulic supply unit 20 to insert the B pin 56*d* of the top boom 56 into the fixing hole of the fifth boom 55 (to reduce the B-pin cylinder 1).

Specifically, the controller 35 outputs a control signal for turning off the energization to the first electromagnetic switching valve 14, turning off the energization to the second electromagnetic switching valve 15, and turning on the energization to the third electromagnetic switching valve 16.

In the boom connection step, the first electromagnetic switching valve 14 is in the first state (unenergized state). In the boom connection step, the second electromagnetic switching valve 15 is in the first state (unenergized state). In the boom connection step, the third electromagnetic switching valve 16 is in the second state (energized state).

Accordingly, the working fluid retained between the second electromagnetic switching valve 15 and the B-pin cylinder 1 is returned to the tank 27 via the first electromagnetic switching valve 14 and the return oil pipeline 32. The B-pin cylinder 1 is reduced by the biasing force of the built-in compression coil spring 5, and the B pin 4 is moved to the fixation side by the biasing force of the compression coil spring 22 (see FIG. 1).

An operation of the boom connecting means 70 in the boom connection step will be described with reference to FIG. 4. In the boom connection step, the B-pin driving lever 74 swings as the B-pin cylinder 1 contracts. When the B-pin driving lever 74 swings, the B pin 56*d* moves to the fixation side via the roller 75.

As a result, the B pin 56*d* of the top boom 56 is inserted into the fixing hole 55*f* of the fifth boom 55. The top boom base end 56*a* is connected to the fifth boom 55. The controller 35 recognizes that the pair of adjacent booms are connected to each other based on a detection signal from proximity switch 115.

As stated above, the top boom base end 56*a* and the fifth boom 55 are connected. When the boom connection step is ended, the step proceeds to the next cylinder-boom disconnection step.

In this boom connection step, since the hydraulic pipeline from the B-pin cylinder 1 to the tank 27 is also very short, an operation delay does not cause a problem. As a result, very good responsiveness is obtained also in the boom connection step.

(Cylinder-Boom Disconnection Step)

When the expansion and contraction operation lever 81 is further operated toward the expansion side, the cylinder-boom disconnection step is performed.

In the cylinder-boom disconnection step, the controller 35 outputs a control signal for instructing the hydraulic supply unit 20 to release the connected state between the C pin 7 and the top boom 56. Specifically, the controller 35 outputs a control signal for turning on the energization to the first electromagnetic switching valve 14, turning off the energization to the second electromagnetic switching valve 15, and turning off the energization to the third electromagnetic switching valve 16.

In the cylinder-boom disconnection step, the first electromagnetic switching valve 14 is in the second state (energized state). In the cylinder-boom disconnection step, the second electromagnetic switching valve 15 is in the first state (unenergized state). In the cylinder-boom disconnection step, the third electromagnetic switching valve 16 is in the first state (unenergized state).

Accordingly, the working fluid of the hydraulic unit 24 (the pressurized working fluid accumulated in the hydraulic accumulator 31) is supplied to the C-pin cylinder 2 through the first electromagnetic switching valve 14, the second electromagnetic switching valve 15, the third electromagnetic switching valve 16, and the hydraulic pipeline 9. The C-pin cylinder 2 is driven to the expansion side while expanding the extension coil spring 8, and moves the C pin 7 to the release side.

The cylinder-boom disconnection step will be described with reference to FIG. 3. In the cylinder-boom disconnection step, the C-pin cylinder 2 expands, and thus, the C pin 7 is removed from the connecting hole 56*b* of the top boom 56 via the C-pin driving lever 21.

Accordingly, the cylinder tube rod side end 45 of the expandable cylinder 43 (the movable part 11 of the expandable cylinder 43) and the top boom base end 56*a* are disconnected. The controller 35 recognizes that the connected state between the cylinder and the boom is released based on a detection signal from the proximity switch 102 (see FIG. 8).

As stated above, the connected state between the top boom base end 56*a* and the movable part 11 (C pin 7) of the expandable cylinder 43 is released. When the cylinder-boom disconnection step is ended, the step proceeds to the next expandable cylinder contraction step.

In this cylinder-boom disconnection step, since the hydraulic pipeline between the hydraulic unit 24 and the C-pin cylinder 2 is also very short, an operation delay does not cause a problem. As a result, very good responsiveness is obtained also in the cylinder-boom disconnection step.

(Expandable Cylinder Contraction Step)

In the expandable cylinder contraction step, the controller 35 outputs a control signal instructing the expandable cylinder hydraulic supply unit 105 to contract the expandable cylinder 43. Specifically, the controller 35 outputs a control signal to the electromagnetic proportional valve 108.

As a result, the pilot type switching valve 107 is switched, and the hydraulic source P is connected to the second outlet port of the pilot type switching valve 107. The working fluid from the hydraulic source P is supplied to the contraction side oil chamber of the expandable cylinder 43 through the hydraulic pipeline 112. Accordingly, the expandable cylinder 43 starts a contraction operation alone.

In the expandable cylinder contraction step, the controller 35 calculates a distance (hereinafter, referred to as a second distance) between the C pin 7 and the connecting hole of the fifth boom 55 based on a detection signal from the cylinder length detecting means 92. The connecting hole of the fifth boom 55 is a connecting hole into which the C pin 7 is inserted in the cylinder-boom connection step to be described later.

In the expandable cylinder contraction step, the second distance calculated by the controller 35 is a distance of the expandable boom 50 in the axial direction. When the second distance is equal to or less than a predetermined distance, the controller 35 outputs a signal (hereinafter, also simply referred to as a deceleration signal) for decelerating a contraction speed (that is, a moving speed of the cylinder tube 44) of the expandable cylinder 43 to the expandable cylinder hydraulic supply unit 105. The case where the second distance is equal to or less than the predetermined distance may be regarded as a case where the C pin 7 reaches a deceleration start point.

Specifically, in the expandable cylinder contraction step, the cylinder length detecting means 92 continues to send a detection signal indicating the length of the expandable cylinder 43 to the controller 35. When the C pin 7 reaches the deceleration start point, the controller 35 gradually decreases an output signal value to the electromagnetic proportional valve 108. That is, when the C pin 7 reaches the deceleration start point, the controller 35 outputs a control signal (also referred to as a second deceleration signal) for gradually reducing the contraction speed of the expandable cylinder 43 to the electromagnetic proportional valve 108.

Thus, the pilot pressure applied from the electromagnetic proportional valve 108 to the pilot type switching valve 107 gradually decreases in response to the second deceleration control signal. As a result, a spool of the pilot type switching valve 107 is gradually returned.

As the spool of the pilot type switching valve 107 is gradually returned, an opening area of the second outlet port of the pilot type switching valve 107 gradually decreases. As a result, a flow rate of the working fluid discharged from the second output port of the pilot type switching valve 107 decreases. Accordingly, the contraction speed of the expandable cylinder 43 decreases.

When it is determined that the C pin 7 has reached the position of the connecting hole of the fifth boom 55 to be inserted in the cylinder-boom connection step to be described later, the controller 35 stops the contraction operation of the expandable cylinder 43. When the expandable cylinder contraction step is ended, the step proceeds to the next cylinder-boom connection step.

In the expandable cylinder contraction step, the controller 35 determines whether or not the C pin 7 has reached a target position based on the detection signal from the cylinder length detecting means 92 and the detection signal from the boom base end position detecting means 91. That is, when the detection piece 55*g* installed at the fifth boom base end 55*a* is detected by the proximity switch 96 (see FIG. 7), the controller 35 determines that the C pin 7 has reached the target position.

(Cylinder-Boom Connection Step)

In the cylinder-boom connection step, the controller 35 outputs a control signal instructing the hydraulic supply unit 20 to connect the C pin 7 and the fifth boom 55. Specifically, the controller 35 outputs a control signal for turning off the energization of the first electromagnetic switching valve 14, turning off the energization of the second electromagnetic switching valve 15, and turning off the energization of the third electromagnetic switching valve 16.

In the cylinder-boom connection step, the first electromagnetic switching valve 14 is in the first state (unenergized state). In the cylinder-boom connection step, the second electromagnetic switching valve 15 is in the first state (unenergized state). In the cylinder-boom connection step, the third electromagnetic switching valve 16 is in the first state (unenergized state).

Accordingly, the working fluid supplied to the oil chamber of the C-pin cylinder 2 is returned to the tank 27 via the hydraulic pipeline 9, the third electromagnetic switching valve 16, the second electromagnetic switching valve 15, the first electromagnetic switching valve 14, and the return pipeline 32. The C-pin cylinder 2 is driven to the contraction side by the biasing force of the extension coil spring 8, and moves the C pin 7 to the connection side.

The C-pin cylinder 2 is contracted, and thus, the C-pin driving lever 21 is moved. Thus, the C pin 7 is inserted into the connecting hole 55*b* of the fifth boom base end 55*a*. The C pin 7 is inserted into the connecting hole 55*b*, and thus, the cylinder tube rod side end 45 of the expandable cylinder 43 (the movable part 11 of the expandable cylinder 43) and the fifth boom base end 55*a* are connected.

The controller 35 recognizes that the expandable cylinder 43 and the fifth boom 55 are connected based on a detection signal from the proximity switch 103 (see FIG. 8).

Figure 9:
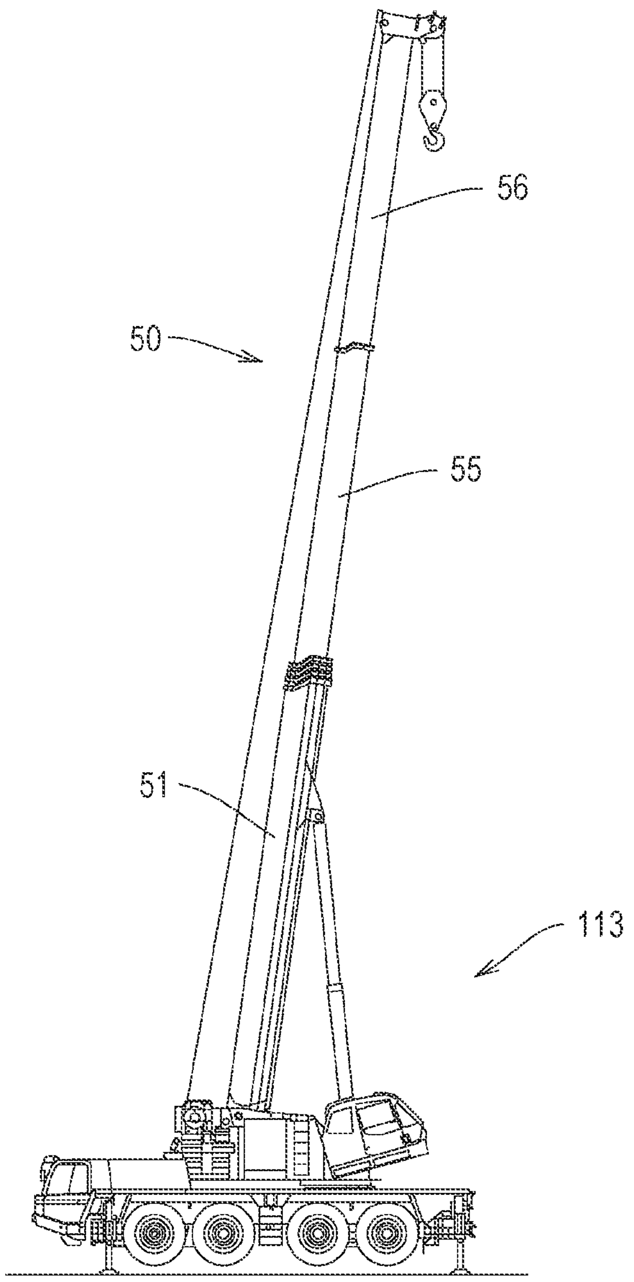
FIG. 9 is a diagram illustrating a crane vehicle on which the expansion device is mounted.

In this cylinder-boom connection step, since the hydraulic pipeline from the C-pin cylinder 2 to the hydraulic unit 24 is very short, an operation delay does not cause a problem. Thereafter, the above-described steps are repeated, and thus, the fifth boom 55 is expanded. Thus, when the final boom state illustrated in FIG. 9 is obtained, the controller of the expansion device ends the operation.

As described above, the expansion device according to the present embodiment includes one expandable cylinder 43 which is built in the expandable boom 50 in which the plurality of booms 51 to 56 including the base boom 51, the intermediate booms 52 to 55, and the top boom 56 is expandably fitted and inserted and of which one end is pivotally supported by the base end 51*a* of the base boom 51, the boom connecting means 70 which has the B pins 52*d* to 56*d* (fixing pins) and the B-pin cylinder 1 (first hydraulic cylinder) for inserting and removing the B pins 52*d* to 56*d* and fixes two adjacent booms of the plurality of booms 51 to 56 by the B pins 52*d* to 56*d*, the cylinder-boom connecting means 64 which has the C pin 7 (connecting pin) and the C-pin cylinder 2 (second hydraulic cylinder) for inserting and removing the C pin 7 and connects a specific boom to be expanded and contracted among the plurality of booms 52 to 56 and the expandable cylinder 43 by the C pin 7, and the hydraulic supply unit 20 (hydraulic supply unit) that supplies the hydraulic pressure to the B-pin cylinder 1 and the C-pin cylinder 2. The expansion device expands and contracts the plurality of booms 52 to 56 stage by stage by expanding and contracting the expandable cylinder 43 in a state in which the specific boom and the expandable cylinder 43 are connected and a fixed state of two adjacent booms including the specific boom is released.

The hydraulic supply unit 20 has the hydraulic unit 24, the electromagnetic switching valves 14 to 16 (switching valves) that switch between delivery destinations of the working fluid from the hydraulic unit 24, the hydraulic pipeline 6 through which the working fluid is delivered from the electromagnetic switching valves 14 to 16 to the B-pin cylinder 1, and the hydraulic pipeline 9 through which the working fluid is delivered from the electromagnetic switching valves 14 to 16 to the C-pin cylinder 2.

The hydraulic supply unit 20 is disposed in the movable part 11 of the expandable cylinder 43.

Since all the hydraulic unit 24 and the electromagnetic switching valves 14 to 16 constituting the hydraulic supply unit 20 are arranged in the movable part 11 of the expandable cylinder 43, the hydraulic pipeline connecting the hydraulic unit 24 to the B-pin cylinder 1 and the C-pin cylinder 2 is very short. Thus, very good responsiveness is obtained in the B-pin cylinder 1 and the C-pin cylinder 2 regardless of an ambient environmental temperature. Accordingly, the operability of the expansion device is secured even at a low temperature.

Since a large and heavy hose reel is not required, the mountability of the crane vehicle is improved. There is no need for the expandable cylinder that is complicated and difficult to be manufactured, such as the expandable cylinder with the built-in oil feed pipe.

REFERENCE SIGNS LIST

1 B-pin cylinder
100, 101 support
102, 103 proximity switch
104 detection piece
105 expandable cylinder hydraulic supply unit
106 counterbalance valve
107 pilot type switching valve
108, 109 electromagnetic proportional valve
110 flow control valve
11 movable part
113 crane vehicle
114, 115 proximity switch
116 detection piece
14 first electromagnetic switching valve
15 second electromagnetic switching valve
16 third electromagnetic switching valve
2 C-pin cylinder
20 hydraulic supply unit
22 compression coil spring
24 hydraulic unit
25 electric motor
26 hydraulic pump
27 tank
28 check valve
29 high-pressure filter
30 discharge pipeline
31 hydraulic accumulator
32 return pipeline
33 relief valve
34 hydraulic sensor
35 controller
37 cable reel
38 power line
39, 40, 41, 42 control signal line
4 B pin
43 expandable cylinder
44 cylinder tube
45 cylinder tube rod side end
5 compression coil spring
50 expandable boom
51 base boom
51*a* base boom base end
52 second boom (intermediate boom)
52*a* second boom base end
52*b* to 56*b* connecting hole
52*d* B pin
52*g* to 56*g* detection piece
53 third boom (intermediate boom)
53*a* third boom base end
53*d* B pin
54 fourth boom (intermediate boom)
54*a* fourth boom base end
54*d* B pin
55 fifth boom (intermediate boom)
55*a* fifth boom base end
55*d* B pin
55*f* fixing hole
56 top boom
56*a* top boom base end
56*b* connecting hole
56*d* B pin
6 hydraulic pipeline
60 cable
62 length detector
63 cord
64 cylinder-boom connecting means
65 trunnion member
66 C-pin housing hole
7 C pin
70 boom connecting means
72 connecting member
73 B-pin driving means
75 roller
8 extension coil spring
80 expansion and contraction operation means
81 expansion and contraction operation lever
82 final boom state input means
83 expansion and contraction information display means
84 display screen
85 expansion length
86 expansion ratio
87 circle
88 box-shaped cursor
9 hydraulic pipeline
90 expansion and contraction state detecting means
91 boom end position detecting means
92 cylinder length detecting means
93 C-pin state detecting means
94 B-pin state detecting means
95 to 99 proximity switch

The invention claimed is:

1. An expansion device that expands and contracts an expandable boom having a first boom element and a second boom element which expandably overlap each other, the expansion device comprising:

a first hydraulic source that discharges a first working fluid;

an expandable cylinder that has a fixed part and a movable part movable with respect to the fixed part, is operated based on supply of the first working fluid, and moves the first boom element with respect to the second boom element in a stretching direction;

a second hydraulic source that is provided in the movable part, discharges a second working fluid, is a hydraulic source different from the first hydraulic source, and has a tank, an electric motor, and a hydraulic pump driven by the electric motor;

a first connecting mechanism that is provided in the movable part, is operated based on supply of the second working fluid, and switches between a connected state and a disconnected state between the first boom element and the movable part; and a second connecting mechanism that is provided in the movable part, is operated based on the supply of the second working fluid, and switches between a connected state and a disconnected state between the first boom element and the second boom element.

2. The expansion device according to claim 1, wherein the second hydraulic source further has an accumulator that pressurizes and accumulates the second working fluid discharged from the hydraulic pump, and the first connecting mechanism and the second connecting mechanism are operated based on the supply of the second working fluid accumulated in the accumulator.

3. The expansion device according to claim 2, further comprising: a control unit that drives the electric motor when a hydraulic pressure of a pipeline to which the accumulator is connected becomes smaller than a predetermined value.

4. The expansion device according to claim 3, wherein the control unit intermittently rotates the electric motor.

5. The expansion device according to claim 3, wherein the control unit is disposed in the movable part.

6. The expansion device according to claim 2, wherein the tank, the hydraulic pump, the electric motor, and the accumulator are unitized by connecting the tank and the hydraulic pump by a first pipe, electrically connecting the hydraulic pump and the electric motor, and connecting the hydraulic pump and the accumulator by a second pipe.

7. The expansion device according to claim 1, wherein power is supplied to the electric motor via a cable delivered from a reel along with movement of the movable part.

8. The expansion device according to claim 1, wherein power is supplied to the electric motor from a battery provided in the movable part.

9. The expansion device according to claim 1, wherein the second working fluid is an oil having the same type as a type of the first working fluid.

10. The expansion device according to claim 1, wherein the second working fluid is an oil having a type different from a type of the first working fluid.

11. The expansion device according to claim 1, further comprising: a switching valve that is able to selectively switch between a first state in which the second working fluid is supplied to the first connecting mechanism from the second hydraulic source and a second state in which the second working fluid is supplied to the second connecting mechanism from the second hydraulic source.

12. The expansion device according to claim 11, wherein the switching valve is able to selectively switch between the first state, the second state, a third state in which the second working fluid is discharged from the first connecting mechanism, and a fourth state in which the second working fluid is discharged from the second connecting mechanism.

13. The expansion device according to claim 11, wherein the switching valve is constituted by a plurality of electromagnetic valves.

14. A crane comprising:

an expandable boom having a first boom element and a second boom element which expandably overlap each other; and the expansion device according to claim 1.

* * * * *